L. H. JENKINS.
ROCK DRILL.
APPLICATION FILED OCT. 24, 1907.
913,389.
Patented Feb. 23, 1909.
6 SHEETS—SHEET 1.
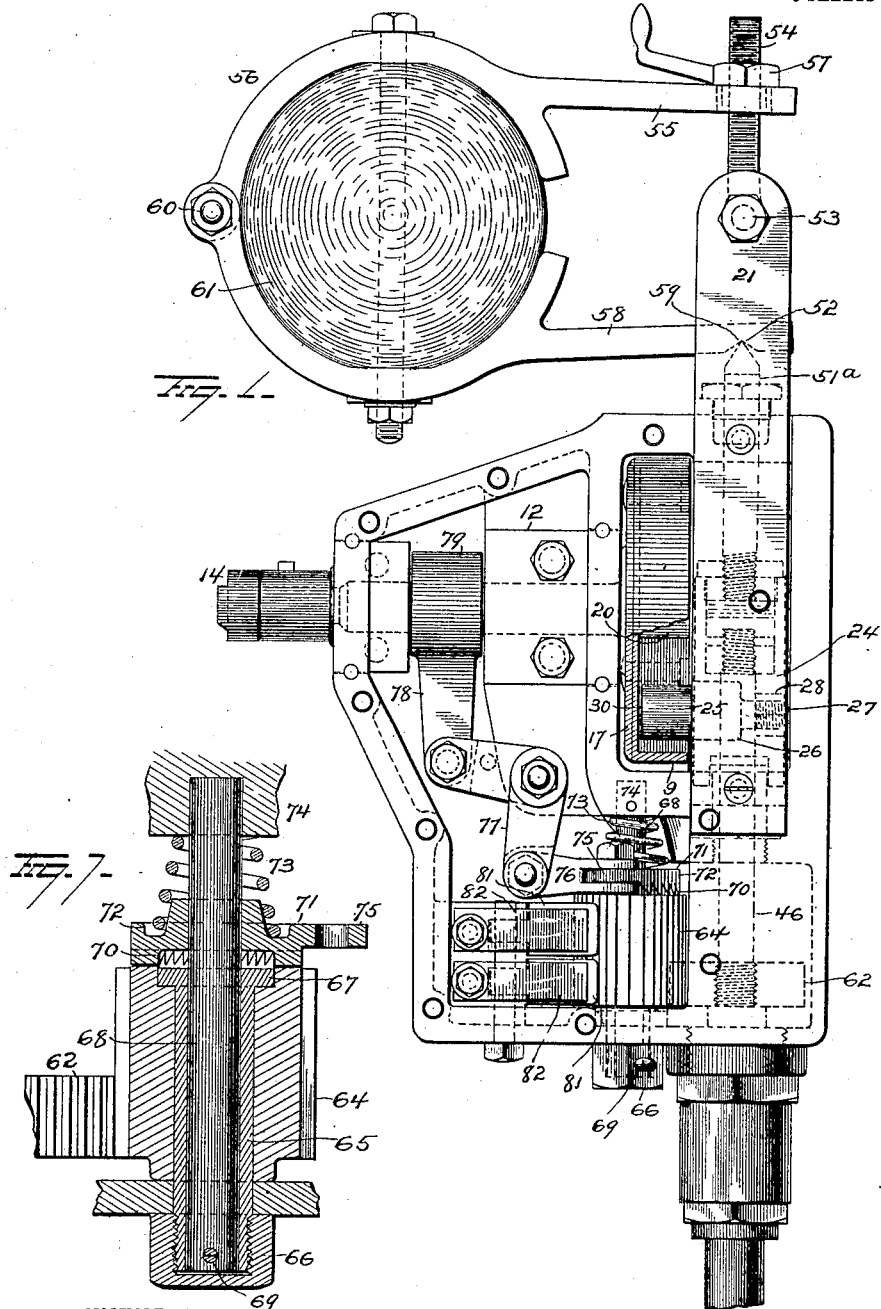
WITNESSES
E. Nottingham
G. F. Downing
INVENTOR
L. H. Jenkins
By H. A. Seymour
Attorney L. H. JENKINS.
ROCK DRILL.
APPLICATION FILED OCT. 24, 1907.
913,389.
Patented Feb. 23, 1909.
6 SHEETS—SHEET 2.
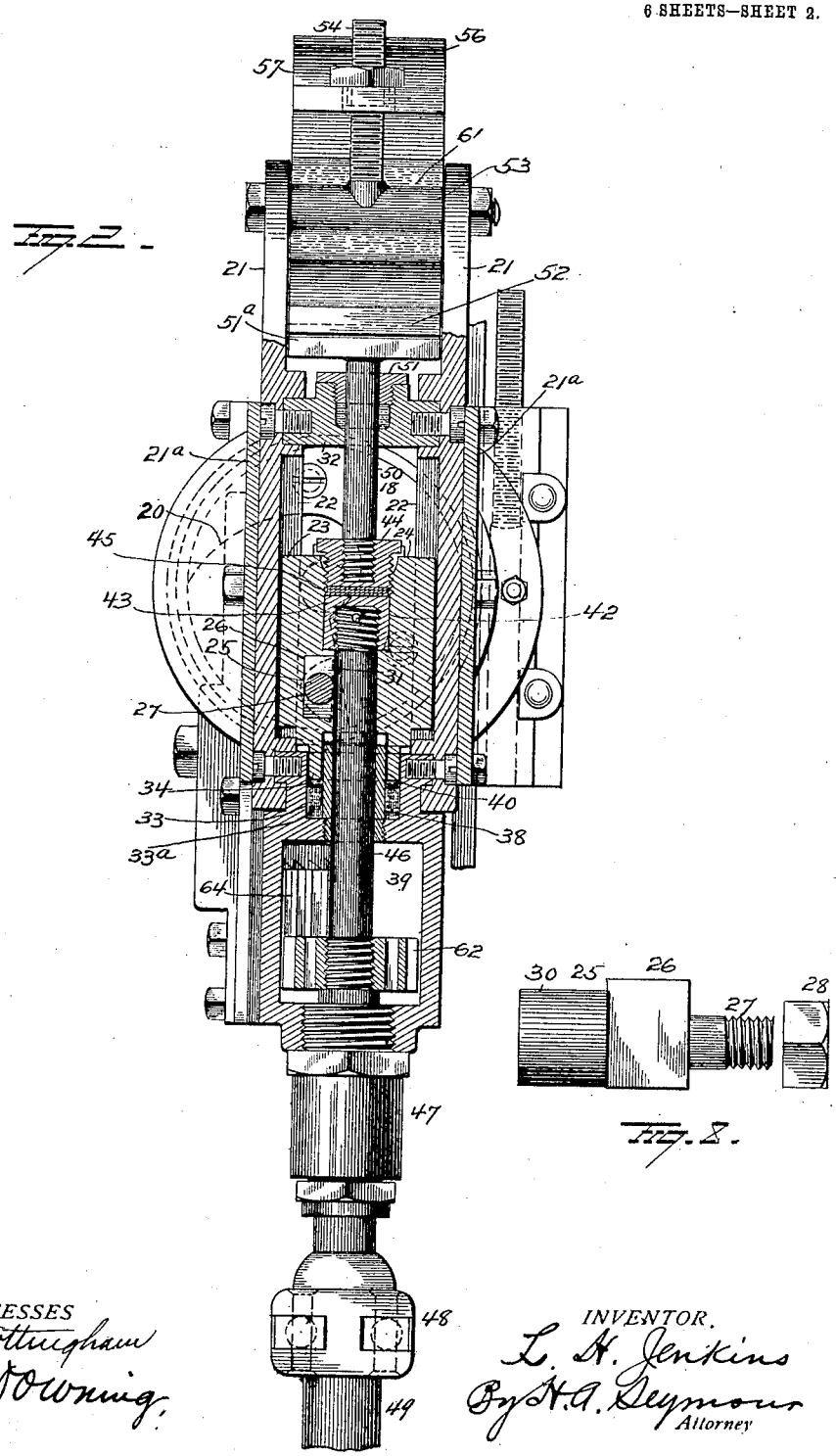

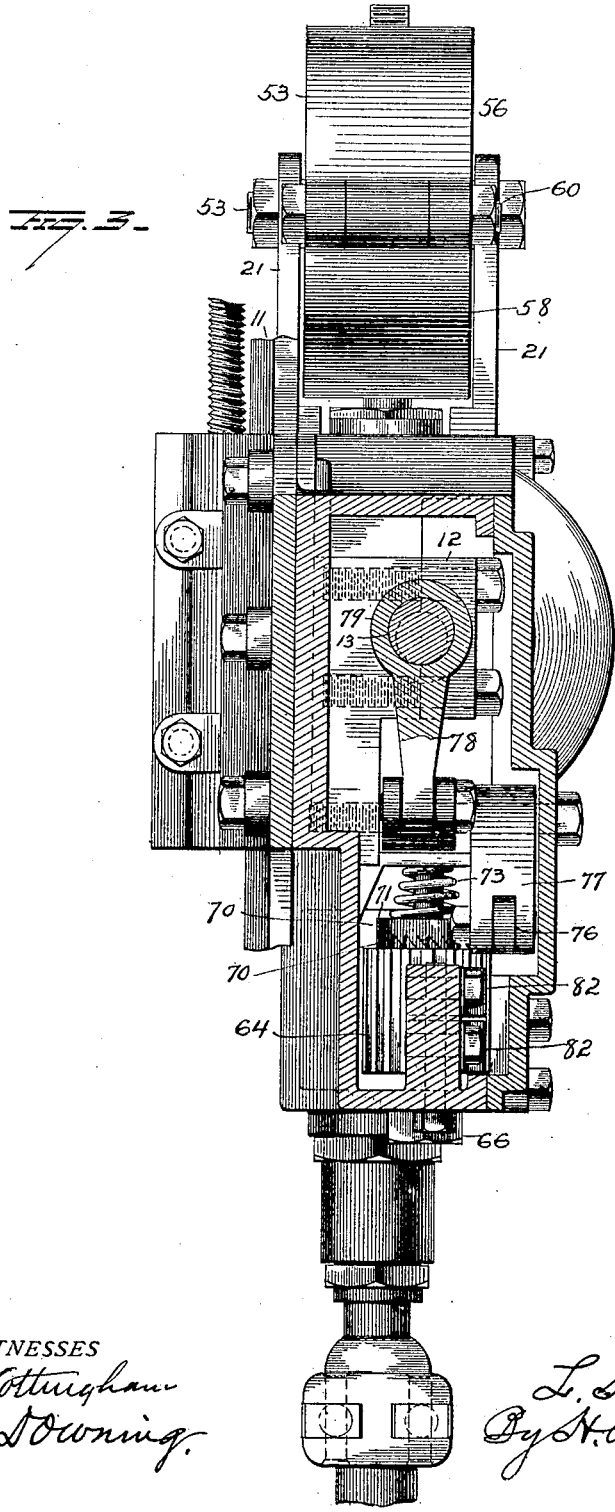

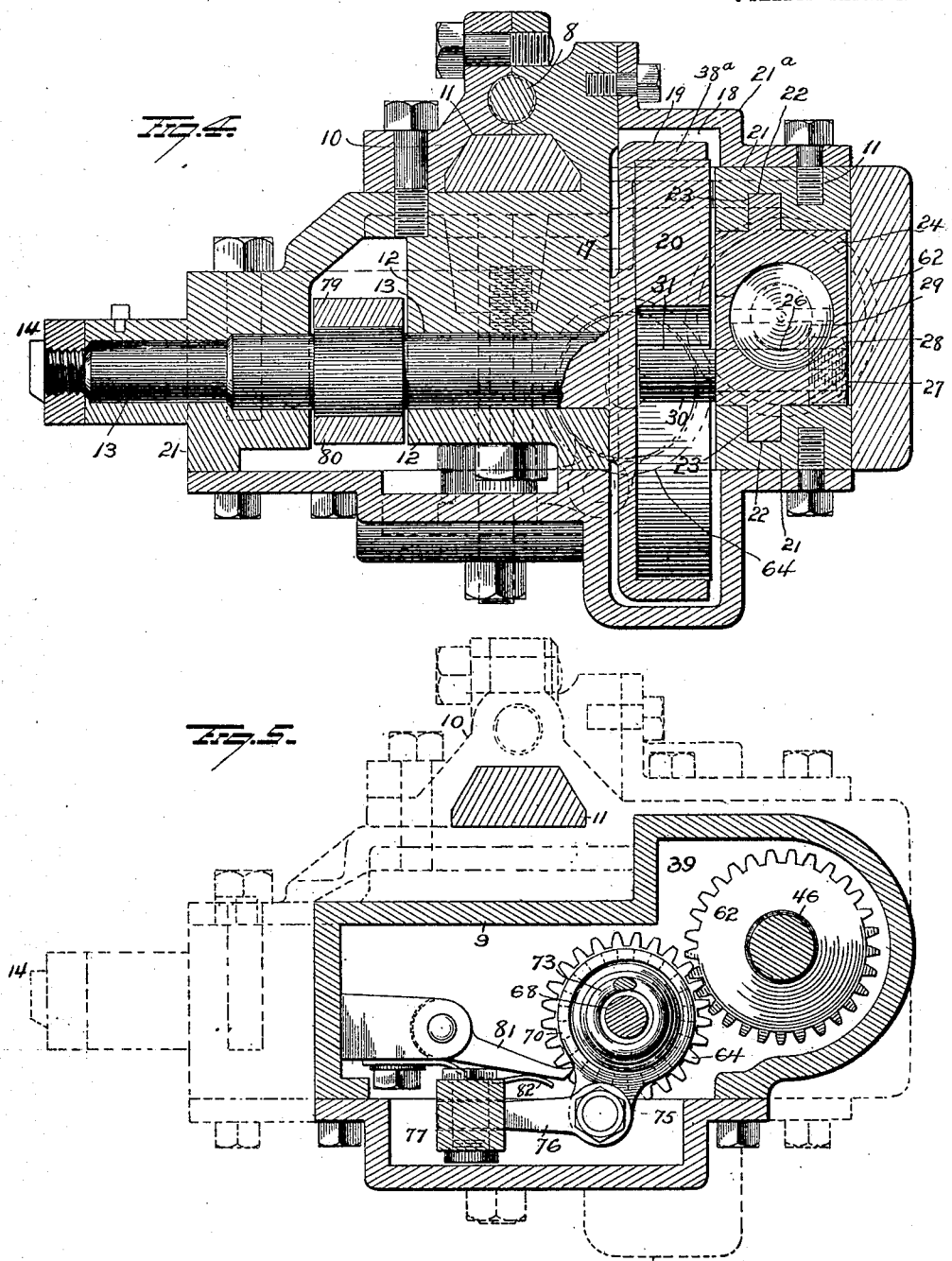

L. H. JENKINS.
ROCK DRILL.
APPLICATION FILED OCT. 24, 1907.
913,389.
Patented Feb. 23, 1909.
6 SHEETS—SHEET 5.
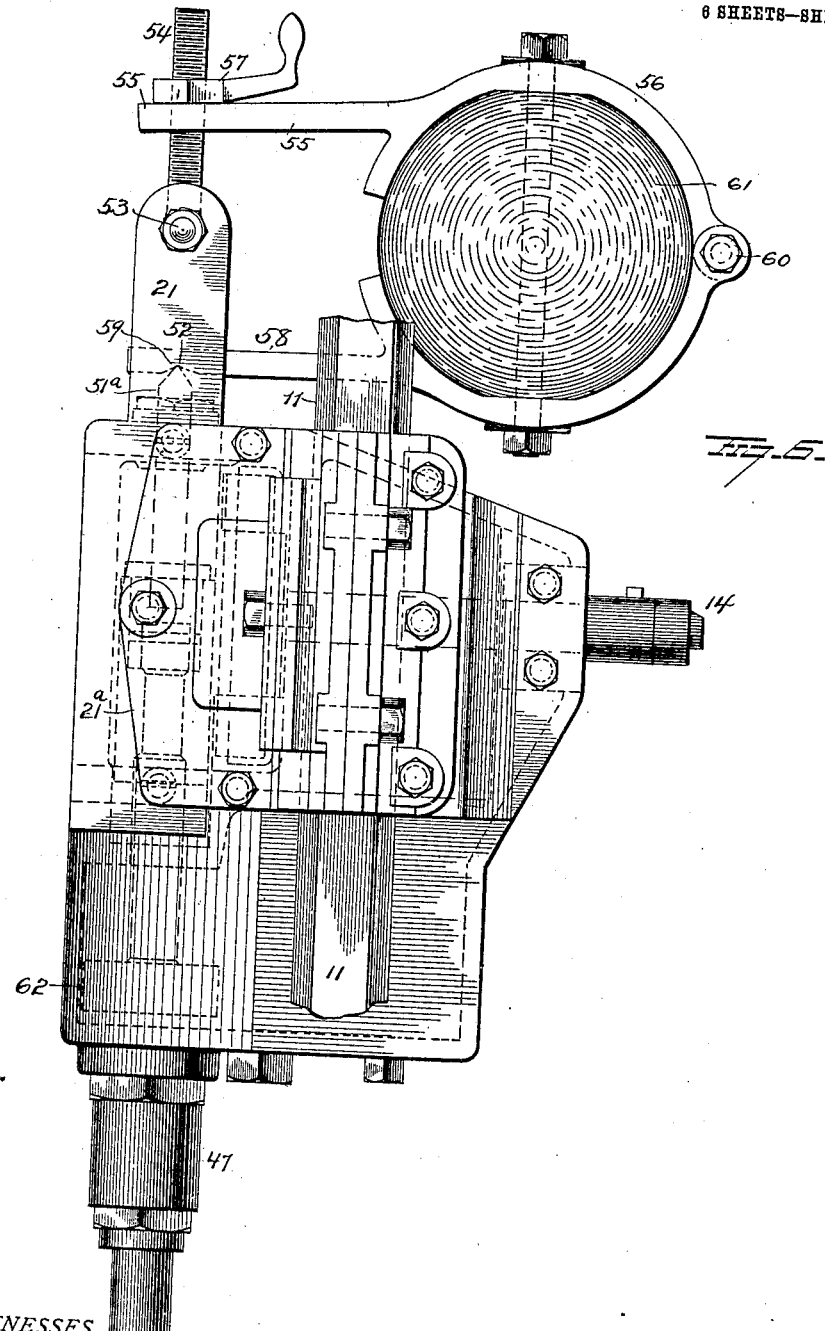

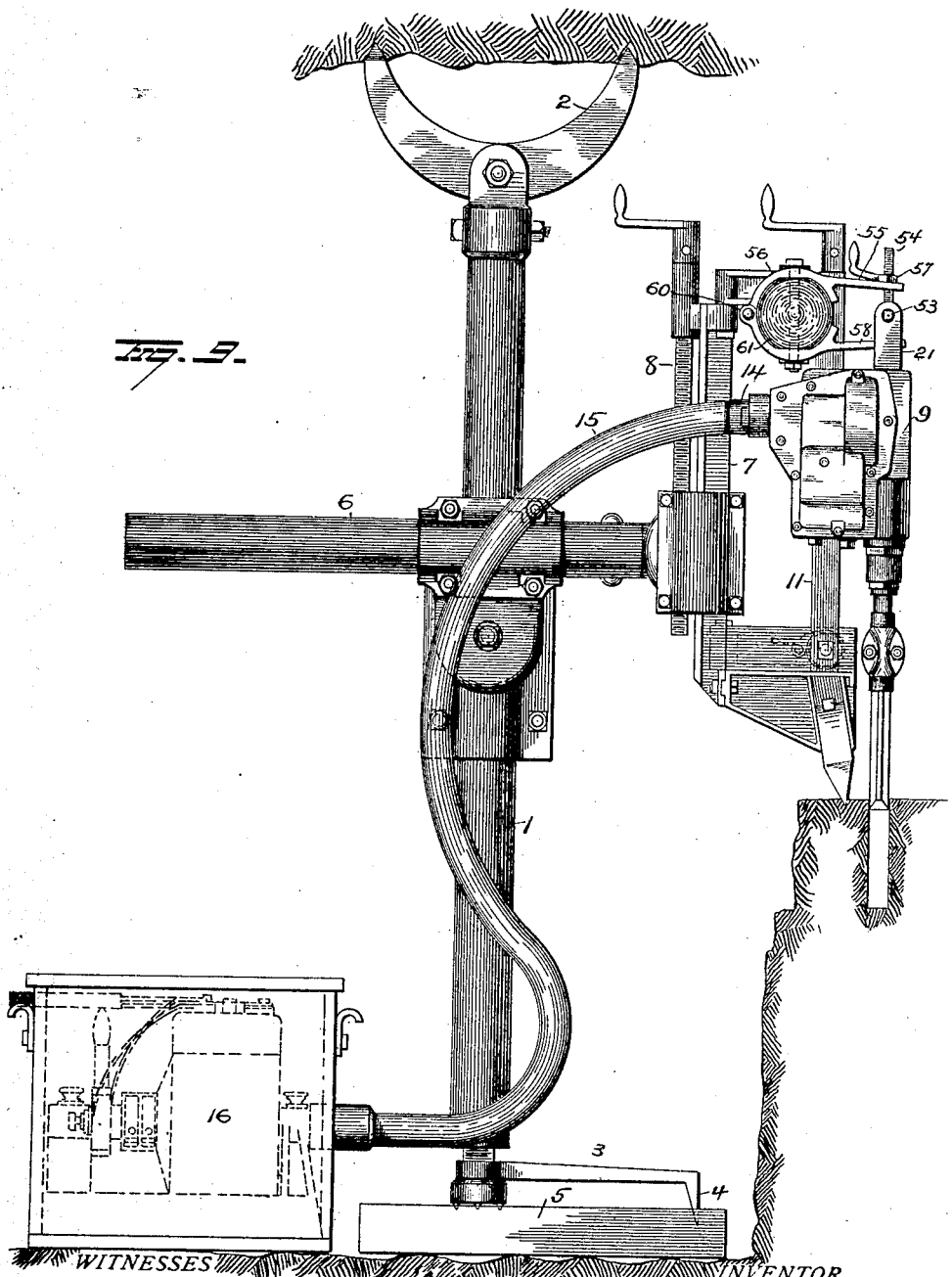

UNITED STATES PATENT OFFICE.

LEONA H. JENKINS, OF PHILADELPHIA, PENNSYLVANIA.

ROCK-DRILL.

No. 913,389.  Specification of Letters Patent.  Patented Feb. 23, 1909.

Application filed October 24, 1907. Serial No. 398,959.

*To all whom it may concern:*

Be it known that I, LEONA H. JENKINS, a resident of Philadelphia, in the county of Philadelphia and State of Pennsylvania, have invented certain new and useful Improvements in Rock-Drills; and I do hereby declare the following to be a full, clear, and exact description of the invention, such as will enable others skilled in the art to which it appertains to make and use the same.

My invention relates to improvements in rock drills, an object of the invention being to provide a spring-actuated drill with improved means for actuating and controlling the reciprocating and also the rotary motion of the drill rod.

A further object is to improve and simplify various parts of the structure as hereinafter specifically explained.

With these objects in view the invention consists in certain novel features of construction and combinations of parts as hereinafter set forth and pointed out in the claims.

In the accompanying drawings, Figure 1 is a side elevation of the body of the machine with the side cover plate removed and showing the structure of the casing and the relative arrangement of various parts of the mechanism. Fig. 2 is a vertical sectional view on the line $x$—$x$ of Fig. 1. Fig. 3 is a rear view partly in section. Fig. 4 is a horizontal sectional view. Fig. 5 is a transverse sectional view through the lower portion of the machine. Fig. 6 is a side elevation looking at the opposite side of the machine from that shown in Fig. 1. Fig. 7 is an enlarged detail sectional view of portions of the devices for rotating the drill rod. Fig. 8 is a detail view of the pin which coöperates with the cam to control the movements of the drill rod, and Fig. 9 is an elevation on a smaller scale illustrating the complete machine.

1 represents a supporting post or jack of any preferred form of construction, but preferably having a curved arm 2 at its upper end to engage the roof of the chamber of rock in which the drill is to be operated. A foot 3 is adjustably attached to the post 1 and a toothed arm 4 connected with said foot is adapted to engage a base block 5 on which the foot of the post is located. A bar 6 is supported by the post 1, and with one end of this bar, a frame 7 is connected and adapted to be adjusted longitudinally of a screw 8.

The details of construction of the devices thus far referred to are fully shown and described in Letters-Patent granted to me on the 10th day of November 1896 and designated by No. 571,231.

The casing 9 (which contains and incloses the drill operating mechanism) is made of strong wrought steel and provided with a bracket 10 on one side for the reception of a guide bar 11 which constitutes a portion of the frame 7, and on which, said casing can be adjusted vertically by means of a screw, as also fully disclosed by my former patent to which I have above referred.

Split blocks, 12, are located within the casing 9 for the accommodation of a shaft 13, one end of which projects beyond the casing, where it is provided with a suitable clutch 14 for attachment of a flexible shaft 15, receiving motion from a suitable motor (preferably an electric motor) 16, as clearly shown in Fig. 9. The outer or forward end of the shaft 13 terminates in an integral disk 17 located within a chamber 18 in the casing, and provided with a forwardly projecting peripheral flange 19. A cam block 20 is secured to the flanged disk 17, and the heel of this cam is made with a hardened surface.

Parallel guide bars 21, 21, are securely bolted in the casing 9 and project some distance above the same. These guide bars are made with grooves 22 in which guide ribs or flanges 23 of a cross-head 24, move vertically. This cross head is made in a single piece of steel and carries a pin 25 which projects into the path of the cam block 20 so as to be actuated in one direction thereby. The pin 25 is made with an angular portion 26 seated in a similarly shaped socket in the cross head, and with a shank 27 having a threaded end to receive a nut 28 for preventing longitudinal displacement of the pin, said nut being housed within a recess 29 in the wall of the cross head. The portion 30 of the pin, which projects into the path of the cam so as to be engaged thereby, is hardened on its lower edge only, and is also preferably made with a flat face 31. From the above description, it will be seen that the heel of the cam is hardened where the pin drops off, and that the pin is also hardened where it engages the cam just before dropping of the same. That portion of the casing 9 within which the cross head operates, constitutes a part of the chamber 18 hereinbefore referred to, and the top of this chamber, over the cross head is closed by a plate 32 secured between the guide bars 21, the sides of said chamber being closed by the cover plates 21ª of the casing. The bottom of the chamber 18 is made with a recess or cushion cup 33, the lower part of which contains Para rubber and rawhide 33ª. The cross head 24 is provided at its lower end with an annular projection or plunger 34 adapted to enter the recess or cup 33 and engage the rubber and rawhide therein, when the cross head completes its downward throw. It will be observed however, that the cup 33 and flange or plunger 34 constitute an efficient dash-pot structure. Thus, when the cross head 24 descends, the flange or plunger 34 entering the cup 24 will tend to check the movement of the cross head, and as the air and lubricant which may be contained in the cup becomes expelled from the cup 33, the plunger will be fully checked and will come to rest upon the rawhide and rubber in the bottom of said cup.

With the construction and arrangement of parts as above described, it will be seen that as the cross head reciprocates, lubricant contained in the chamber 18 will be agitated and so thrown against the various moving parts as to keep them thoroughly lubricated.

A sleeve 38 projects upwardly through the center of the recess 33 and communicates with a chamber 39 below the same, in the casing 9. This sleeve is also adapted to enter a recess 40 in the lower end of the cross head 24 when the latter descends.

The cross head 24 is made with a socket 42 in which a block 43 is located, and the upper portion of the wall of said socket is threaded for the reception of a plug 44, between which and the block 43, disks 45 may be placed to compensate for wear caused by action of the drill rod 46 which is connected with the block 43. The drill rod 46 passes through a hole in the cross head below the block 43 and its threaded upper end enters a threaded socket in said block. The drill rod passes downwardly from the cross head, through the sleeve 38 and also through the lower chamber 39 in the casing 9, the lower end of said rod then passing through a suitable packing box 47 secured to the bottom of the casing and is provided at its free end with a suitable chuck 48 for the reception of a drill tool or bit 49.

The plug 44 in the upper end of the cross head, is provided with a threaded socket for the reception of the lower end of a rod 50. This rod passes upwardly through a stuffing box 51 in the plate 32 at the top of chamber 18 in casing 9, and is provided at a point above said casing with a cross bar 51ª disposed between the guide bars 21, and made with a knife edge 52. Another cross bar 53 is secured between the upper ends of the guide bars 21 and provided between its ends with an upwardly projected screw threaded arm 54. The threaded arm 54 passes freely through a hole in one arm 55 of a yoke 56 and a lever nut 57 is screwed on the arm 54 over the arm 55. The other arm 58 of the yoke 56 projects between the guide bars 21 and is notched as at 59 to form a bearing upon the knife edge cross-bar 51ª. The two members of the yoke 56 are hinged together at 60 and curve to form seats for a rubber spring 61 the tension of which can be adjusted by means of the lever nut 57, but the spring will be maintained under normal tension by means of a bolt passing through the respective members of the yoke.

A pinion 62 is secured to the drill rod within the chamber 39 in the casing 9 and is adapted to reciprocate vertically within said chamber during the reciprocation of the drill rod. Motion is transmitted to the pinion 62 by means of an elongated gear 64 located in the lower portion of the casing 9. This gear is mounted on a sleeve 65 which passes through the bottom of the casing and is threaded at its lower end for the reception of a nut 66. The upper end of the sleeve is provided with an annular flange or head 67 countersunk in the upper end of the gear 64 and serving to prevent vertical displacement of the latter. A shaft 68 passes through and upwardly beyond the sleeve 65 and is preferably secured to said sleeve by means of a suitable fastening device 69. The upper end of the gear is provided with a circular series of ratchet teeth 70, and above said ratchet teeth, a disk 71 is loosely mounted on the shaft 68 and provided with a circular series of ratchet teeth 72 held normally in mesh with the ratchet teeth 70 by means of a spring 73 which encircles the shaft 68 and bears at its respective ends against the disk 71 and an abutment 74 into a socket in which, the shaft 68 projects. The disk 71 is provided with an arm 75, to which one end of a link 76 is pivotally attached, the other end of said link being connected with one member of a bell-crank-lever 77. The other member of the bell-crank-lever is pivotally attached to an arm 78 which projects from an eccentric strap 79, the latter being mounted upon and actuated by an eccentric 80 on the main shaft 13. Motion is transmitted from the eccentric 80 to the ratchet disk 71, through the medium of the devices above described, for the purpose of oscillating said disk, and motion is imparted in one direction by said ratchet disk to the gear wheel 64. The gear wheel is prevented from rotation in the reverse direction by pivoted dogs 81 which are pressed into engagement with the teeth of the gear by means of springs 82.

With the construction and arrangement of parts hereinbefore described, it will be seen that the rotation of the main shaft 13 will cause the cam 20 to coöperate with the pin for the purpose of raising the cross head 24 and drill rod 46 and then release the same to the action of the spring 61 by means of which the blow of the tool is effected. It will also be observed that rotary motion of the tool is also effected by mechanism controlled by the main shaft 13.

The operation of the machine may be briefly described as follows:—Motion is transmitted from the electric motor to the shaft 13, through the medium of the flexible shaft, thus causing the cam 20 to turn to the right and drive the point of the cam under the pin 25. As the cam continues to turn, the pin will be lifted toward the center of the cam shaft 13 and the cross head 24 will be raised. The spring 61 in the yoke will be compressed during the upward movement of the cross head and the drill rod will then be raised or withdrawn by the latter. The cam 20 continues to turn, raising the pin and cross head, until the toe of the cam passes from under the pin, (the latter being about three-fourths of an inch to the left of the center of the cam shaft), when their two edges were parallel to each other, and without releasing the spring, the pin drops off the heel of the cam and the spring then delivers its force to the drill rod, driving it hard toward the rock. While the above movements were taking place, the devices for effecting rotary motion of the drill rod were operating as follows:

When the drill rod made its lift or upward stroke, the eccentric 80 began to move the arm 78 downwardly, thus transmitting motion to the bell-crank-lever 77 and causing the latter (through the medium of the links 76) to actuate the ratchet disk 71 in a direction to turn the gear 64. The gear 64 will thus be turned a distance of one tooth, which motion is transmitted to the drill rod through the medium of the pinion 63. During the upward stroke of the eccentric arm 78 the ratchet disk will be raised to ride over the ratchet teeth 70 on the gear 64 (the latter being held from retrograde rotation by the dogs 81), and then assume its normal position, the drill rod having thus been turned during its up stroke, and the devices which caused such turning movement of the drill rod caused to complete their operation and assume their normal positions during said up stroke of the drill rod, said devices being held from turning during the effective stroke of the drill rod by the action of the dogs 81.

Various slight changes might be made in the details of construction of my invention without departing from the spirit thereof or limiting its scope and hence I do not wish to limit myself to the precise details herein set forth.

Having fully described my invention what I claim as new and desire to secure by Letters-Patent, is:—

1. In a drill, the combination with a casing and arms or bars projecting above the same, of a cross head in said casing, a drill rod connected with said cross head, means for moving the cross head in one direction, a yoke comprising two members hinged together at one end, a spring between the members of the yoke, connections between one member of the yoke and the cross head, and means for adjustably connecting the other member of the yoke with the outwardly projecting arms or bars on the casing.

2. In a drill the combination with a casing, a cross head therein, and a drill rod connected with said cross head, of parallel arms or bars projecting above the casing, a rod connected with the cross head and projecting above the casing, a cross bar on said rod and having a knife edge, a cross bar between the upper ends of said parallel arms or bars, a screw projecting upwardly from said last-mentioned cross bar, a yoke comprising two hinged members, means for adjustably connecting one of said members with said screw, the other member of the yoke resting upon the knife edge cross bar, a spring between the yoke members, and means for raising the cross head to compress the spring yoke and then release said cross head to the action of said spring yoke.

3. In a drill, the combination of a casing, a cross head movable therein, a cam for moving said cross head in one direction and a spring for moving it in the other direction, said cross head consisting of a single piece having a recess, a block in said recess, and a drill rod passing upwardly through the lower portion of the cross head and secured to said block.

4. In a drill, the combination with a casing, a cam, a cross head in the casing, and a pin projecting from the cross head and coöperating with the cam, of a block seated in the cross head, a drill rod passing downwardly through the lower portion of the cross head and secured to said block, a removable plug in the cross head over the block therein, disks interposed between said plug and block, a rod secured to the plug, and a spring connected with the casing and with said last mentioned rod.

5. In a drill, the combination with a casing, of guide bars secured therein and projecting above the same, of a cross head movable between said guide bars, a drill rod secured to said cross head, an upwardly projecting rod also secured to the cross head and terminating above the casing, a knife edge cross bar at the upper end of said upwardly projecting rod, a yoke comprising hinged members, one of which rests upon said knife edge cross bar, a cross bar between the upper ends of the guide bars, a screw on said last-mentioned cross bar and adjustably connected with the other member of the yoke, a spring between the yoke members, and means for moving the cross head to withdraw the drill rod and compress said spring and then release the cross head to the action of said spring.

6. In a drill, the combination with a casing, a drill rod, means for reciprocating the drill rod, of a pinion on said drill rod, a gear wheel meshing with said pinion, said gear wheel provided with ratchet teeth on one end, a ratchet disk engaging said ratchet teeth, a bell-crank-lever, a link connecting one member of said lever with the ratchet disk an eccentric a connection between said eccentric and the other member of the bell-crank-lever, and means for preventing retrograde rotation of the gear wheel.

7. In a drill, the combination with a casing, a drill rod, and means for reciprocating the drill rod, of a pinion on the drill rod, a sleeve secured to the casing, a gear wheel mounted on said sleeve and meshing with said pinion, a flange on the upper end of said sleeve and engaging the upper end of the gear wheel, a fixed shaft passing through said sleeve, ratchet teeth on the upper end of the gear wheel, a ratchet disk mounted on said shaft a spring pressing said disk toward the ratchet teeth on the gear wheel, an arm on said disk, a bell-crank-lever, a link connecting one member of said lever with the arm on the ratchet disk, an eccentric, an arm connecting the strap of said eccentric with the other arm of said bell-crank-lever, and means for preventing retrograde rotation of said gear wheel.

In testimony whereof, I have signed this specification in the presence of two subscribing witnesses.

LEONA H. JENKINS.

Witnesses:
  JOHN W. RITTER,
  WM. H. JENKINS.